Patented Dec. 21, 1948

2,456,752

UNITED STATES PATENT OFFICE 2,456,752

RESOLUTION OF RACEMIC TARTARIC ACID

Joseph D. Surmatis, Nutley, N. J., assignor, by mesne assignments, to The Brush Development Company, Cleveland, Ohio, a corporation of Ohio No Drawing. Application May 2, 1946, Serial No. 666,827

7 Claims. (Cl. 260—536)

My present invention relates to the resolution of racemic tartaric acid into its optically active isomers and provides a commercially practical method for the production of such isomers, and their salts and especially for the production of levo-tartaric acid and its salts.

In the practice of the present invention racemic tartaric acid is dissolved in hot water together with 2-(d- gluco - d - gulo - hepto - hexahydroxy-hexyl)-benzimidazole or its equivalent. The resulting reaction produces a solution of the benzimidazole salts of levo-tartaric and dextro-tartaric acids. I have discovered that there is a marked difference in the solubility of these two salts in water at room temperature, and thereby have found a way of separating them without the use of expensive non-solvent liquids such as alcohol. Accordingly, I separate the levo and dextro salts merely by cooling the solution, which precipitates the levo-tartaric acid salt while the dextro-tartaric salt remains in solution. The precipitated levo-tartaric acid salt can be removed as by filtration. By adding a water soluble hydroxide, such as potassium or ammonium hydroxide, to the aqueous solution of the dextro salt to render the solution alkaline, the benzimidazole base is set free and precipitated and may be separated from the solution as by filtration while the salt of d-tartaric acid with the hydroxide remains in solution. Similarly the precipitated levo-tartaric acid salt may be redissolved in hot water and treated with a water soluble hydroxide such as ammonium or potassium hydroxide and the benzimidazole base is thereby similarly set free and precipitated and separated from the solution.

In either case any desired tartaric acid salt, such as the alkali metal, alkaline earth metal, ammonium salts, etc., can be produced from the separated solution by using the proper neutralizing agent. For example, if the solution has been made alkaline by adding ammonium hydroxide, calcium tartrate can be precipitated by adding a water soluble calcium salt, such as calcium chloride, to the alkaline solution. By adding an aqueous solution of sulfuric acid to the calcium tartrate, a solution of tartaric acid can be obtained. If potassium hydroxide has been used instead of ammonium hydroxide, the alkaline solution may be acidified until the pH is about 3.5 when potassium acid tartrate will precipitate. If the neutralizing agent forms a soluble tartrate, the latter may be recovered by evaporation.

The practice of the invention is further illustrated by the following examples:

Example 1

Racemic tartaric acid, one kilogram, is dissolved in two liters of hot water, for example at a temperature of 80–90° C., together with two kilograms of 2-(d-gluco-d-gulo-hepto-hexa-hydroxy-hexyl)-benzimidazole. The solution is filtered hot and the filtrate then cooled until a solid cake of crystalline precipitate is formed. This precipitate is the salt of levo-tartaric acid with the benzimidazole base. The salt of the dextro-tartaric acid remains in solution. The solid crystalline material is filtered off in any convenient manner and as much of the liquid is removed as possible. It is then recrystallized from another 2 liters of water and is ready for the recovery of the levo-tartaric acid. An example of how this may be accomplished is given as follows:

The levo-tartaric salt is dissolved in two liters of hot water and made alkaline with a 10% ammonium hydroxide solution. The resolving agent, that is, the benzimidazole base, is set free and separates out as a crystalline precipitate. This is filtered off, preferably while still warm, and recovered for re-use. The filtrate may either be evaporated to recover ammonium levo-tartrate or treated with an aqueous solution of a water soluble salt of an alkaline earth metal, as for example 740 grams calcium chloride, calculated on the basis of anhydrous calcium chloride, to precipitate the levo form of the alkaline earth metal tartrate.

To recover the dextro salt of tartaric acid the solution of the benzimidazole salt of dextro-tartaric acid may be made alkaline with ammonium hydroxide which sets free and precipitates the resolving agent. The precipitated resolving agent is filtered off and if the dextro tartaric acid is desired in the form of the calcium salt, the filtrate may be treated with 740 grams of calcium chloride, calculated on the basis of anhydrous calcium chloride, which precipitates the dextro form of calcium tartrate.

The free tartaric acid may be recovered by treating the respective calcium salts in suspension in water with an amount of sulfuric acid as nearly as possible equivalent to the theoretical amount required to liberate the tartaric acid, then filtering off the calcium sulfate and evaporating the solution. In this case 619 grams of sulfuric acid, sp. gr. 1.84, was used, this amount being determined by calculations made on the basis of 1 kilogram of anhydrous racemic tartaric acid and assuming a 90 percent recovery.

Example 2

This example illustrates a method of obtaining the optically active potassium acid tartrates by my resolution procedure.

Racemic tartaric acid, 1 kilogram, is dissolved in two liters of hot water together with 2 kilograms of the resolving agent, 2-(d-gluco-d-gulo-hepto - hexahydroxyhexyl) - benzimidazole. The solution is filtered hot and the filtrate then cooled until the crystalline levo-tartaric acid salt of the benzimidazole base separates out, leaving the dextro-tartaric acid salt in solution. The separated levo-salt is filtered off and recrystallized from two liters of water. It may then be redissolved in 2 liters of hot water and treated with a solution of potassium hydroxide until it is alkaline as indicated by litmus paper. On cooling, the resolving agent crystallizes out and is removed by filtration or other suitable means. The filtrate is then acidified with acetic acid, until a pH of 3.5 is obtained and then cooled to give a crystalline precipitate of the levo-form of potassium acid tartrate.

The solution of the dextro-tartaric acid salt of the benzimidazole base, which was separated from the levo salt, is similarly made alkaline by the addition of a solution of potassium hydroxide. This sets free and precipitates the resolving agent, which is filtered off. The resulting filtrate is then adjusted to a pH of about 3.5 with acetic acid under which conditions the dextro form of potassium acid tartrate separates out.

I claim:

1. The method of separating racemic tartaric acid into its optically active isomers which comprises making a solution in hot water of racemic tartaric acid and 2-(d-gluco-d-gulo-hepto-hexahydroxy-hexyl)-benzimidazole, and removing heat from said solution while maintaining it with only its original constituents and thereby separating the resulting levo benzimidazole salt from the dextro salt.

2. The method of separating racemic tartaric acid into its optically active isomers which comprises making a solution in hot water of racemic tartaric acid and 2-(d-gluco-d-gulo-hepto-hexahydroxyhexyl) - benzimidazole, removing heat from said solution while maintaining it with only its original constituents and thereby separating the benzimidazole salt of levo-tartaric acid from said solution, removing the separated salt from the solution, dissolving the separated salt in hot water, adding a solution of a water soluble hydroxide to the hot aqueous solution of the separated salt to precipitate said benzimidazole and form a solution of a salt of levo-tartaric acid with said hydroxide, and separating the solution from the precipitated benzimidazole, said water soluble hydroxide being one which forms a water soluble salt with tartaric acid.

3. The method of producing a salt of levo-tartaric acid from racemic tartaric acid which comprises making a solution in hot water of racemic tartaric acid and 2-(d-gluco-d-gulo-hepto - hexahydroxyhexyl) - benzimidazole, cooling the solution to cause separation of the benzimidazole salt of levo-tartaric acid, removing the separated salt of levo-tartaric acid from the solution, dissolving the separated salt of levo-tartaric acid in hot water, adding an aqueous solution of a water soluble hydroxide to the solution of the salt of levo-tartaric acid to precipitate said benzimidazole, and recovering the levo-tartaric acid salt from the separated solution, said water soluble hydroxide being one which forms a water soluble salt with tartaric acid.

4. The method of producing a salt of levo-tartaric acid from racemic tartaric acid which comprises making a solution in hot water of racemic tartaric acid and 2-(glyco-d-gulo-hepto-hexahydroxy-hexyl)-benzimidazole, cooling the solution to cause separation of the benzimidazole, salt of levo-tartaric acid, removing the separated salt of levo-tartaric acid from the solution, dissolving the separated salt of levo-tartaric acid in hot water, adding an aqueous solution of ammonium hydroxide to the solution of the salt of levo-tartaric acid to precipitate said benzimidazole and form a solution of the salt of levo-tartaric acid with said hydroxide, separating the solution from the precipitated benzimidazole, and recovering the levo-tartaric acid salt from the separated solution.

5. The method of producing a salt of levo-tartaric acid from racemic tartaric acid which comprises making a solution in hot water of racemic tartaric acid and 2-(d-gluco-d-gulo-hepto-hexahydroxy-hexyl)-benzimidazole, cooling the solution to cause separation of the benzimidazole salt of levo-tartaric acid, removing the separated salt of the levo-tartaric acid from the solution, dissolving the separated salt of levo-tartaric acid in hot water, adding an aqueous solution of ammonium hydroxide to the solution of the salt of levo-tartaric acid to precipitate said benzimidazole and form a solution of the salt of levo-tartaric acid with said hydroxide, separating the solution from the precipitated benzimidazole, adding a water soluble salt of an alkaline earth metal to the separated solution to precipitate the alkaline earth metal salt of levo-tartaric acid, and separating the alkaline earth metal salt of levo-tartaric acid.

6. The method of producing a salt of levo-tartaric acid from racemic tartaric acid which comprises making a solution in hot water of racemic tartaric acid and 2-(d-gluco-d-gulo-hepto-hexahydroxy-hexyl)-benzimidazole, cooling the solution to cause separation of the benzimidazole salt of levo-tartaric acid, removing the separated salt of levo-tartaric acid from the solution, dissolving the separated salt of levo-tartaric acid in hot water, adding an aqueous solution of a water soluble hydroxide to the solution of the salt of levo-tartaric acid to precipitate said benzimidazole and form a solution of the salt of levo-tartaric acid with said hydroxide, separating the solution from the precipitated benzimidazole, adding a water soluble calcium salt to the separated solution to precipitate the calcium salt of levo-tartaric acid, and separating the calcium salt, said water soluble hydroxide being one which forms a water soluble salt with tartaric acid.

7. The method of producing a salt of levo-tartaric acid from racemic tartaric acid which comprises making a solution in hot water of racemic tartaric acid and 2-(d-gluco-d-gulo-hepto-hexahydroxyhexyl)-benzimidazole, cooling the solution to cause separation of the benzimidazole salt of levo-tartaric acid, removing the separated salt of levo-tartaric acid from the solution, dissolving the separated salt of levo-tartaric acid in hot water, adding an aqueous solution of potassium hydroxide to the solution of the salt of levo-tartaric acid to precipitate said benzimidazole and form a solution of the salt of levo-tartaric acid with said hydroxide, separating the solution from the precipitated benzimidazole, acidifying the separated solution until its pH is about 3.5 to precipitate potassium acid tartrate, and separating said potassium salt.

JOSEPH D. SURMATIS.

REFERENCES CITED

The following references are of record in the file of this patent:

Haskins, et al., J. Amer. Chem. Soc., vol. 61, pp. 1266–1267, 1939.

Adams et al., "Organic Reactions," chapter 9, vol. 2, 1944, John Wiley and Sons, New York.